US012305842B1

(12) United States Patent
Ding

(10) Patent No.: US 12,305,842 B1
(45) Date of Patent: May 20, 2025

(54) SMART FLASHLIGHT

(71) Applicant: Dong Guan Technomate Metal Ware Manufactory Ltd, Dongguan (CN)

(72) Inventor: Xiaonong Ding, Guangdong Province (CN)

( * ) Notice: Subject to any disclaimer, the term of this patent is extended or adjusted under 35 U.S.C. 154(b) by 0 days.

(21) Appl. No.: 18/766,627

(22) Filed: Jul. 8, 2024

(51) Int. Cl.

| | |
|---|---|
| ***F21V 23/04*** | (2006.01) |
| ***F21L 4/08*** | (2006.01) |
| ***F21V 23/00*** | (2015.01) |
| ***F21V 29/70*** | (2015.01) |
| ***F21V 29/89*** | (2015.01) |
| ***F21V 31/00*** | (2006.01) |
| *F21Y 115/10* | (2016.01) |

(52) U.S. Cl.
CPC .......... *F21V 23/0492* (2013.01); *F21L 4/085* (2013.01); *F21V 23/006* (2013.01); *F21V 29/70* (2015.01); *F21V 29/89* (2015.01); *F21V 31/005* (2013.01); *F21Y 2115/10* (2016.08)

(58) Field of Classification Search
CPC .... F21L 4/00–085; F21V 29/70; F21V 29/89; F21V 31/0005; F21V 23/006; F21V 23/0492
See application file for complete search history.

(56) References Cited

FOREIGN PATENT DOCUMENTS

CN 107205302 A * 9/2017 ................ F21L 4/00

OTHER PUBLICATIONS

Innovation Q+ NPL Search (Year: 2024).*

* cited by examiner

*Primary Examiner* — Anabel Ton

(57) ABSTRACT

The utility model relates to the technical field of flashlights, in particular to a smart flashlight. The smart flashlight comprises a body component, a light head component, a light tail component and a battery component, and further comprises a PCB control board, and the PCB control board is provided with a gyro sensor and an acceleration sensor, enabling the PCB control board to automatically control a light intensity or power-off stop status of the flashlight based on detection information fed back by the gyro sensor and the acceleration sensor, so as to achieve smart operation.

9 Claims, 4 Drawing Sheets

SMART FLASHLIGHT

TECHNICAL FIELD

The utility model relates to the technical field of flashlights, in particular to a smart flashlight.

BACKGROUND OF THE INVENTION

Flashlights have become an indispensable lighting tool in daily life, serving as a reliable solution for indoor power outages, outdoor lighting, and other low-light environments. The flashlights currently available on the market are widely used and offer various adjustable modes, allowing users to switch between long-range and close-range light, as well as utilize different usage patterns such as flashing.

Most flashlights available on the market currently are switched on and off manually by users. In some cases, after using the flashlight, it may be placed on a tabletop without being switched off. This can lead to continuous illumination of the tabletop, resulting in a gradual increase in the temperature of the focused area. This can cause the tabletop to begin smoking, or even pose a risk of fire, presenting a significant safety concern.

Therefore, it is necessary to provide a smart flashlight to solve the above technical problems.

BRIEF SUMMARY OF THE INVENTION

In order to solve the above problems, the utility model provides a smart flashlight, which can automatically control the brightness level and/or switching status of a light head component to achieve smart operation.

The technical scheme adopted by the utility model is as follows.

A smart flashlight comprises a body component, a light head component, a light tail component and a battery component, the light head component is arranged at a top end of the body component, the light tail component is arranged at a tail end of the body component, and the battery component is arranged in the body component and provides working power for the light tail component and the light head component. The smart flashlight further comprises a PCB control board, and the PCB control board is provided with a gyro sensor for detecting a swing amplitude and position of the flashlight and an acceleration sensor for detecting a height position and moving status of the flashlight, enabling the PCB control board to automatically control a brightness level and/or switching status of the light head component based on detection information fed back by the gyro sensor and the acceleration sensor.

Further, the light tail component is provided with a tail base, a tail side shell and a tail cover, the tail base is connected with the body component, the tail side shell is sleeved on the tail base, the tail cover is sleeved on the tail side shell and forms a chamber with the tail base and the tail side shell, and the PCB control board is installed on the tail base and located in the chamber.

Further, the PCB control board is provided with a charging port and a control button, the tail side shell is provided with a through slot at a position corresponding to the charging port, along with a rubber plug, and the tail cover is provided with a pressing piece which abuts against the control button.

Further, the light head component is provided with a head side shell, a light head cover, an LED lamp panel and a lens, the head side cover is connected with the body component, the light head cover is in threaded connection with the head side shell, the LED lamp panel is arranged in the head side shell, and the lens is arranged on the light head cover and covers the LED lamp panel.

Further, the light head component is further provided with a heat dissipation base, the heat dissipation base is arranged in the head side shell, and the LED lamp panel is fixedly arranged on the heat dissipation base.

Further, the heat dissipation base is provided with a fixing ring for fixing the LED lamp panel, a center of the fixing ring is hollowed out for the placement of the LED lamp panel, and an edge of the fixing ring is provided with a fixing post for extending into the heat dissipation base.

Further, the heat dissipation base is formed by integrated molding of aluminum profiles.

Further, the light head component and the light tail component are each provided with an electrical terminal for electrical connection with the battery component.

Further, the battery component is provided with a dry battery and/or a rechargeable battery.

Further, the body component is in threaded connection with the light head component and the light tail component.

The utility model has the following beneficial effects.

The smart flashlight comprises a body component, a light head component, a light tail component and a battery component, the light head component is arranged at a top end of the body component, the light tail component is arranged at a tail end of the body component, and the battery component is arranged in the body component and provides working power for the light tail component and the light head component. The smart flashlight further comprises a PCB control board, and the PCB control board is provided with a gyro sensor for detecting a swing amplitude and position of the flashlight and an acceleration sensor for detecting a height position and moving status of the flashlight, enabling the PCB control board to automatically control a brightness level and/or switching status of the light head component based on detection information fed back by the gyro sensor and the acceleration sensor. The utility model has the advantages of being simple in structure and reasonable in design. By arranging the gyro sensor and the acceleration sensor on the PCB board, the movement status of the flashlight can be determined based on data information detected by the two sensors, so as to automatically adjust a light intensity or power-off stop status of the flashlight and achieve smart operation. Further, this design effectively prevents the light from focusing on the same spot for a long time, minimizes the risks associated with high temperature, and effectively prolongs the service life of the flashlight.

Figure 1:
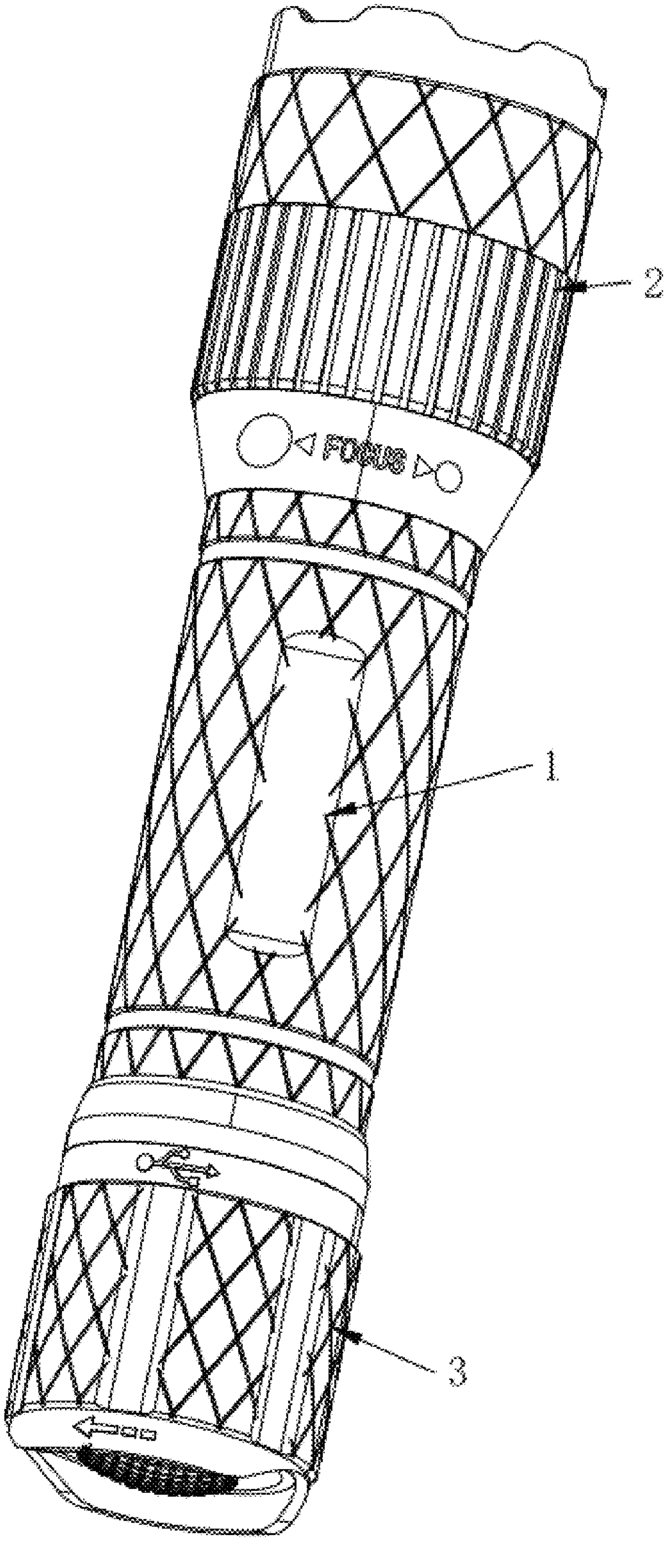
FIG. 1 is a structural diagram according to some embodiments of the application.

DESCRIPTION OF REFERENCE SIGNS body component 1, light head component 2, head side shell 21, light head cover 22, LED lamp panel 23, lens 24, heat dissipation base 25, fixing ring 26, fixing post 261, light tail component 3, tail base 31, tail side shell 32, tail cover 33, pressing piece 34, PCB control board 4, charging port 41, control button 42, gyro sensor 5, acceleration sensor 6.

DETAILED DESCRIPTION OF THE INVENTION

The technical schemes of the utility model will be clearly and completely described below in combination with attached drawings. Obviously, the described embodiments are part of the embodiments of the utility model, not all of them. Based on the embodiments of the utility model, all other embodiments obtained by those of ordinary skill in the art without making creative labor belong to the scope of protection of the utility model.

In the description of the utility model, it should be noted that orientation or positional relationships indicated by terms such as "up", "down", "left", "right", "vertical", "horizontal", "inside", "outside", "front" and "rear" are based on the orientation or positional relationships shown in the accompanying drawings, and are to facilitate the description of the utility model and simplify the description only, rather than indicating or implying that the device or element referred to must have a specific orientation or be constructed and operated in a specific orientation, and therefore cannot be construed as limiting the utility model.

In the description of the utility model, it should be noted that the terms "mount" and "connect" should be understood in a broad sense unless otherwise specified and defined. For example, it can be fixed connection, detachable connection or integrated connection; it can be mechanical connection; and it can be direct connection or indirect connection through intermediate media. For those of ordinary skill in the art, the specific meanings of the above terms in the utility model may be understood according to specific situations.

Figure 2:
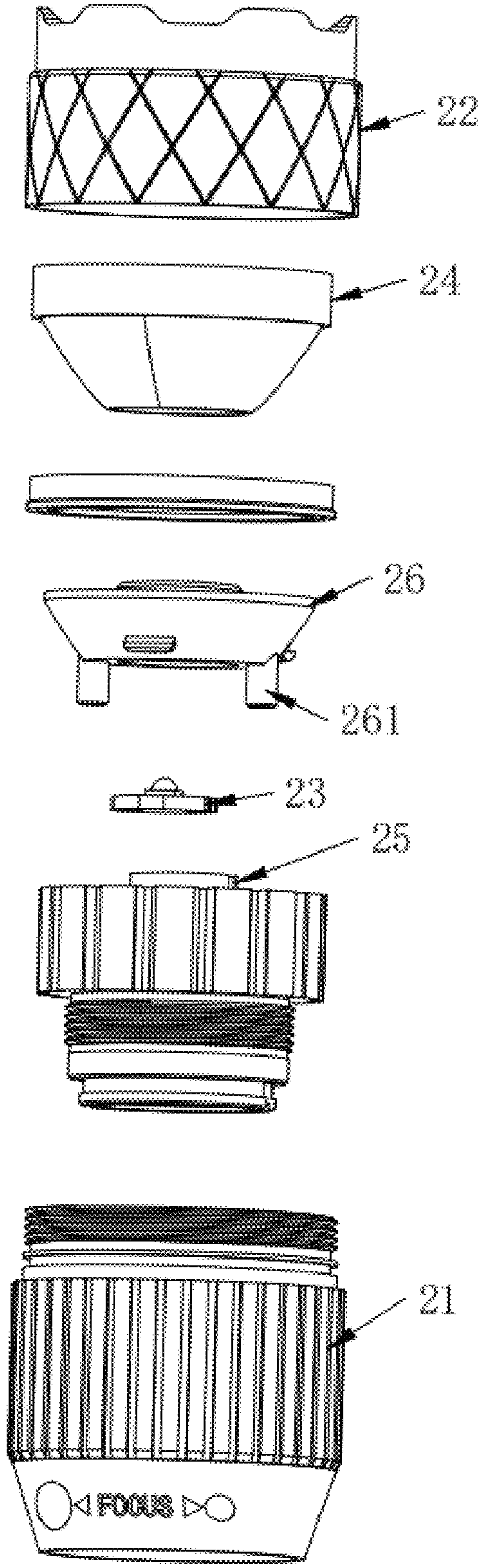
FIG. 2 is an exploded view of a light head component according to some embodiments of the application.
Figure 3:
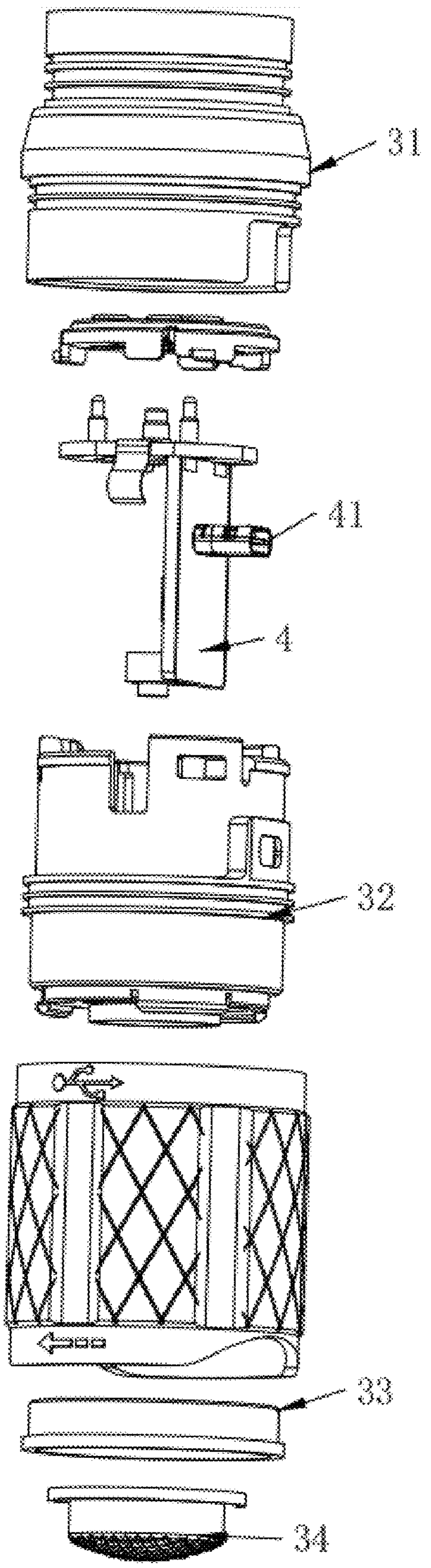
FIG. 3 is an exploded view of a light tail component according to some embodiments of the application.
Figure 4:
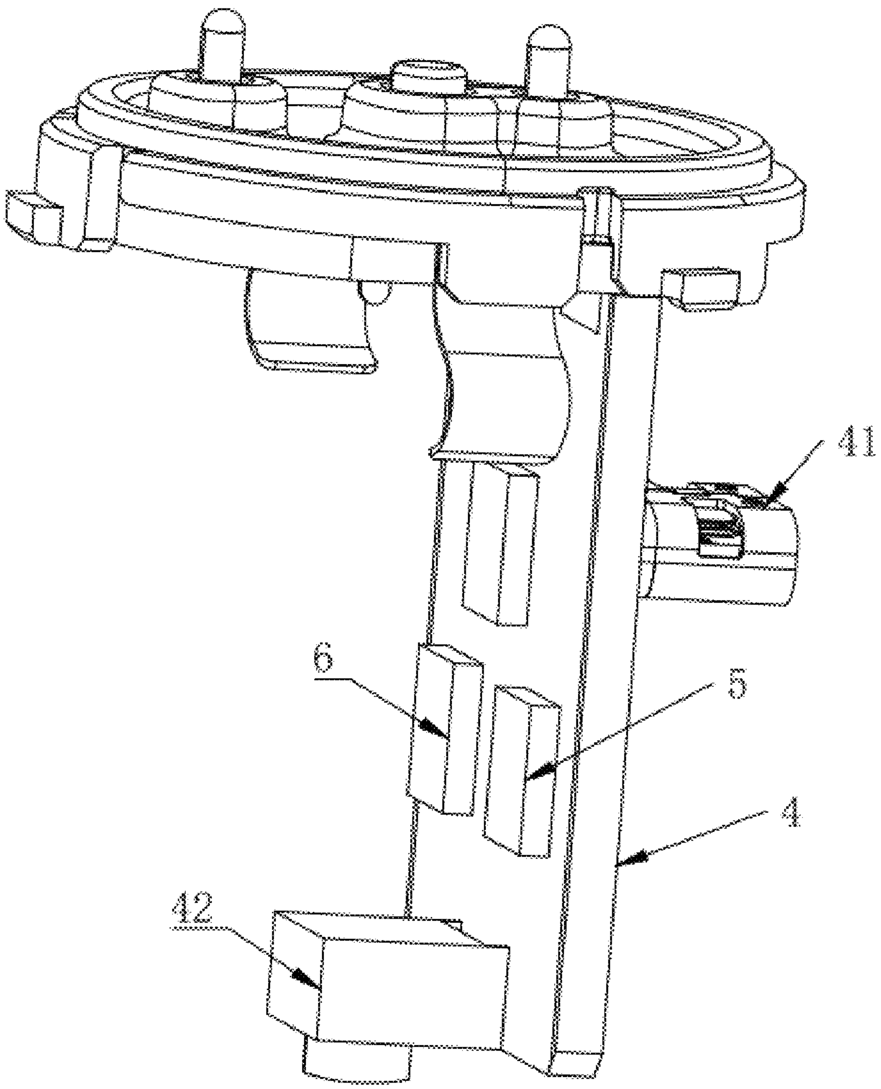
FIG. 4 is a structural diagram of a PCB control board according to some embodiments of the application.

As shown in FIGS. 1-4, a smart flashlight provided by this embodiment comprises a body component 1, a light head component 2, a light tail component 3 and a battery component, the light head component 2 is arranged at a top end of the body component 1, the light tail component 3 is arranged at a tail end of the body component 1, and the battery component is arranged in the body component 1 and provides working power for the light tail component 3 and the light head component 2. The smart flashlight further comprises a PCB control board 4, and the PCB control board 4 is provided with a gyro sensor 5 for detecting a swing amplitude and position of the flashlight and an acceleration sensor 6 for detecting a height position and moving status of the flashlight, enabling the PCB control board 4 to automatically control a brightness level and/or switching status of the light head component 2 based on detection information fed back by the gyro sensor 5 and the acceleration sensor 6.

This embodiment has the advantages of being simple in structure and reasonable in design. By arranging the gyro sensor 5 and the acceleration sensor 6 on the PCB board, the movement status of the flashlight can be determined based on data information detected by the two sensors, so as to automatically adjust a light intensity or power-off stop status of the flashlight and achieve smart operation. Further, this design effectively prevents the light from focusing on the same spot for a long time, minimizes the risks associated with high temperature, and effectively prolongs the service life of the flashlight.

Specifically, when the flashlight is used, the swing amplitude and position of the flashlight may be detected by the gyro sensor 5, and the height position and moving status of the flashlight may be detected by the acceleration sensor 6, so that the PCB control board 4 performs data analysis based on the detection information fed back by the two sensors, and automatically adjusts the brightness level or switching status of the light head component 2. For example, when the flashlight is left stationary for a long time, after analyzing the detection information and determining the moving status and direction of the flashlight, the PCB control board 4 automatically adjusts the brightness of the flashlight to strong, weak or off states, thus reducing battery output loss, preventing the light from focusing on the same spot for a long time, minimizing the risks associated with high temperature, prolonging the service life of the flashlight, and realizing smart operation.

In some embodiments, the light tail component 3 is provided with a tail base 31, a tail side shell 32 and a tail cover 33, the tail base 31 is connected with the body component 1, the tail side shell 32 is sleeved on the tail base 31, the tail cover 33 is sleeved on the tail side shell 32 and forms a chamber with the tail base 31 and the tail side shell 32, and the PCB control board 4 is installed on the tail base 31 and located in the chamber.

Specifically, the PCB control board 4 is provided with a charging port 41 and a control button 42, the tail side shell 32 is provided with a through slot at a position corresponding to the charging port 41, along with a rubber plug, and the tail cover 33 is provided with a pressing piece 34 which abuts against the control button 42.

This embodiment specifically shows the arrangement of the light tail component 3 and the installation position of the PCB control board 4, featuring a simple structure and easy installation. The tail side shell 32 is provided with the through slot at the position corresponding to the charging port 41, allowing for an external power cord to be inserted for charging. By arranging the rubber plug, water, dust or debris can be prevented from entering the charging port 41. Users can touch and press the pressing piece 34 to actuate the control button 42, thereby controlling the light.

In some embodiments, the light head component 2 is provided with a head side shell 21, a light head cover 22, an LED lamp panel 23 and a lens 24, the head side cover is connected with the body component 1, the light head cover 22 is in threaded connection with the head side shell 21, the LED lamp panel 23 is arranged in the head side shell 21, and the lens 24 is arranged on the light head cover 22 and covers the LED lamp panel 23.

Specifically, the light head component 2 is further provided with a heat dissipation base 25, the heat dissipation base 25 is arranged in the head side shell 21, and the LED lamp panel 23 is fixedly arranged on the heat dissipation base 25.

Specifically, the heat dissipation base 25 is provided with a fixing ring 26 for fixing the LED lamp panel 23, a center of the fixing ring 26 is hollowed out for the placement of the LED lamp panel 23, and an edge of the fixing ring 26 is provided with a fixing post 261 for extending into the heat dissipation base 25.

Specifically, the heat dissipation base 25 is formed by integrated molding of aluminum profiles.

This embodiment specifically shows the arrangement of the light head component 2, and the lens 24 is specifically fixed through the abutting cooperation between the head side shell 21 and the light head cover 22. The heat dissipation base 25 is formed by integrated molding of aluminum profiles, resulting in a stable structure and a good heat dissipation effect to reduce the heat and temperature of the LED lamp panel 23. The fixing ring 26 is arranged on the heat dissipation base 25 to facilitate the stable installation of the LED lamp panel 23 and prevent the LED lamp panel 23 from loosening and falling off.

In some embodiments, the light head component 2 and the light tail component 3 are each provided with an electrical terminal for electrical connection with the battery component.

This embodiment specifically shows that the light head component 2 and the light tail component 3 are each provided with an electrical terminal for electrical connection with the battery component, featuring a simple structure and convenient connection.

In some embodiments, the battery component is provided with a dry battery and/or a rechargeable battery.

In this embodiment, the battery component may be flexibly set as a dry battery and/or a rechargeable battery, so that the flashlight can be conveniently powered by battery replacement or charging.

In some embodiments, the body component 1 is in threaded connection with the light head component 2 and the light tail component 3.

In this embodiment, assembly and disassembly can be achieved conveniently by adopting the threaded connection mode. Specifically, in this embodiment, an upper outer end of the body component 1 is provided with external threads, so as to be screwed onto the light head component 2, and a lower inner end of the body component 1 is provided with internal threads, so as to be screwed onto the light tail component 3, thus realizing convenient assembly and disassembly.

The above embodiments only represent several implementation ways of the utility model, and their descriptions are specific and detailed, but they cannot be understood as limiting the scope of the patent of the utility model. It should be pointed out that, for those of ordinary skill in the art, without departing from the concept of the utility model, several modifications and improvements can be made, which belong to the protection scope of the utility model. Therefore, the scope of protection of the patent of the utility model shall be subject to the appended claims.

What is claimed is:

1. A smart flashlight, comprising a body component, a light head component, a light tail component and a battery component, the light head component being arranged at a top end of the body component, the light tail component being arranged at a tail end of the body component, and the battery component being arranged in the body component and providing working power for the light tail component and the light head component; further comprising a PCB control board, the PCB control board being provided with a gyro sensor for detecting a swing amplitude and position of the flashlight and an acceleration sensor for detecting a height position and moving status of the flashlight, enabling the PCB control board to automatically control a brightness level and/or switching status of the light head component based on detection information fed back by the gyro sensor and the acceleration sensor; the light tail component is provided with a tail base, a tail side shell and a tail cover, the tail base is connected with the body component, the tail side shell is sleeved on the tail base, the tail cover is sleeved on the tail side shell and forms a chamber with the tail base and the tail side shell, and the PCB control board is installed on the tail base and located in the chamber.

2. The smart flashlight according to claim 1, wherein the PCB control board is provided with a charging port and a control button, the tail side shell is provided with a through slot at a position corresponding to the charging port, along with a rubber plug, and the tail cover is provided with a pressing piece which abuts against the control button.

3. The smart flashlight according to claim 1, wherein the light head component is provided with a head side shell, a light head cover, an LED lamp panel and a lens, the head side cover is connected with the body component, the light head cover is in threaded connection with the head side shell, the LED lamp panel is arranged in the head side shell, and the lens is arranged on the light head cover and covers the LED lamp panel.

4. The smart flashlight according to claim 3, wherein the light head component is further provided with a heat dissipation base, the heat dissipation base is arranged in the head side shell, and the LED lamp panel is fixedly arranged on the heat dissipation base.

5. The smart flashlight according to claim 4, wherein the heat dissipation base is provided with a fixing ring for fixing the LED lamp panel, a center of the fixing ring is hollowed out for the placement of the LED lamp panel, and an edge of the fixing ring is provided with a fixing post for extending into the heat dissipation base.

6. The smart flashlight according to claim 4, wherein the heat dissipation base is formed by integrated molding of aluminum profiles.

7. The smart flashlight according to claim 1, wherein the light head component and the light tail component are each provided with an electrical terminal for electrical connection with the battery component.

8. The smart flashlight according to claim 1, wherein the battery component is provided with a dry battery and/or a rechargeable battery.

9. The smart flashlight according to claim 1, wherein the body component is in threaded connection with the light head component and the light tail component.

* * * * *